Nov. 21, 1967  R. J. STOLLE ETAL  3,353,515
CAN TREATING APPARATUS
Filed June 10, 1965
5 Sheets—Sheet 1
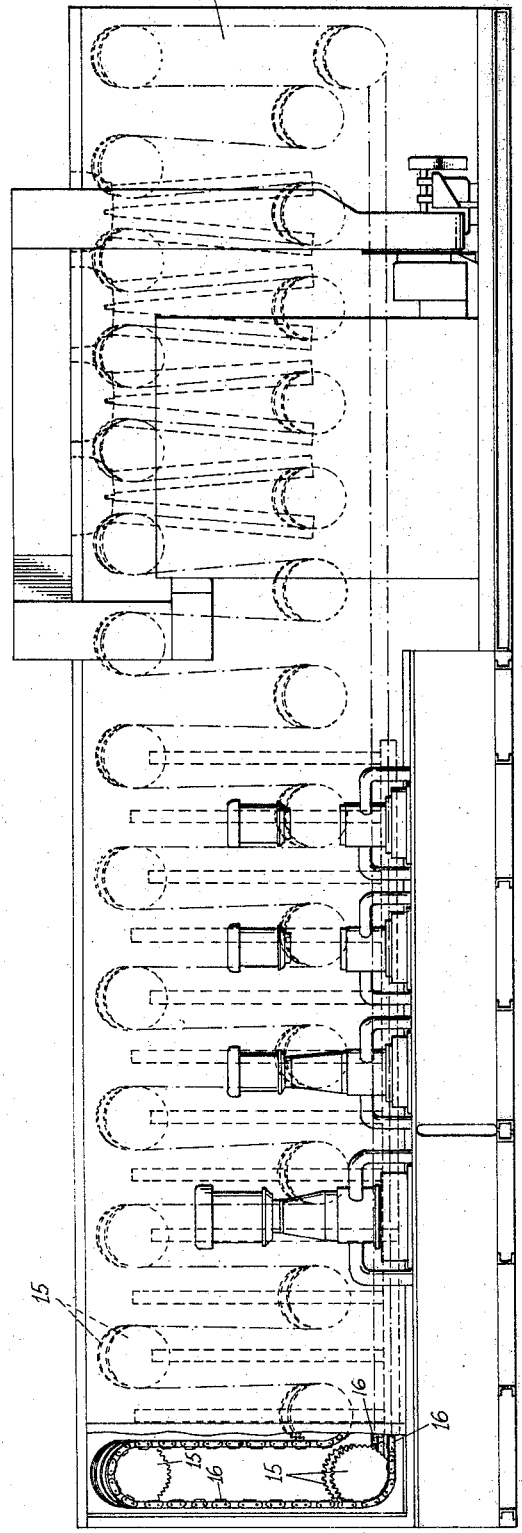
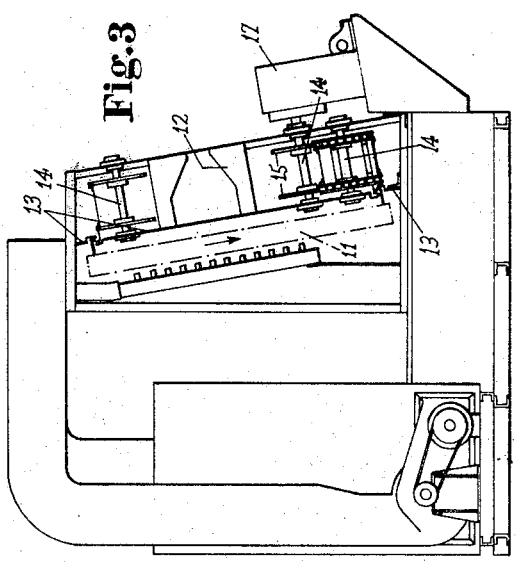
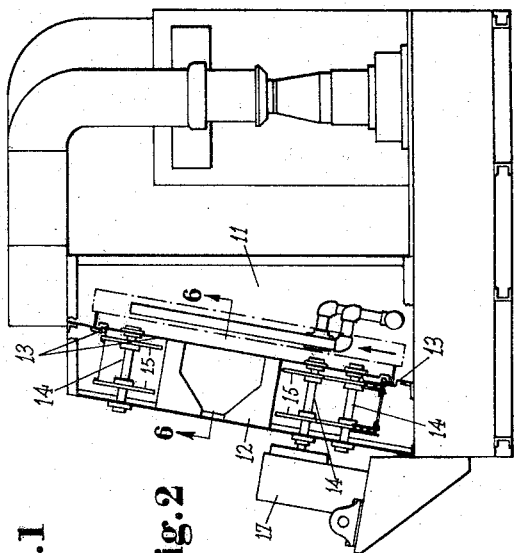
INVENTOR
RALPH J. STOLLE AND
ELTON G. KAMINSKI,
BY
ATTORNEYS.

Nov. 21, 1967 R. J. STOLLE ETAL 3,353,515
CAN TREATING APPARATUS
Filed June 10, 1965 5 Sheets-Sheet 3
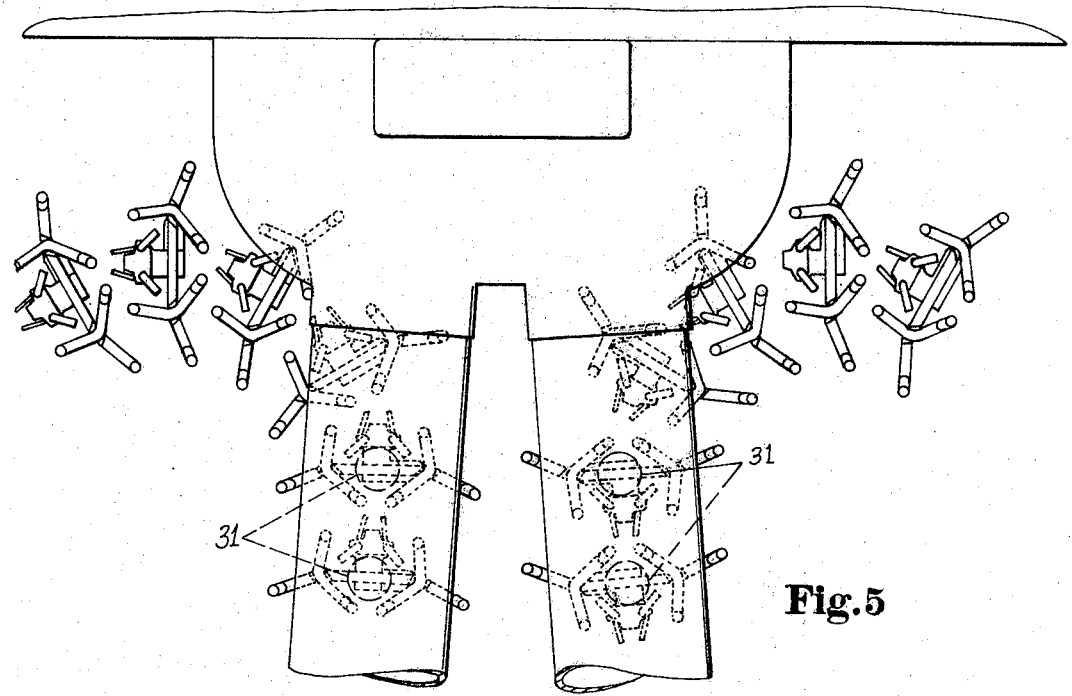
Fig.5
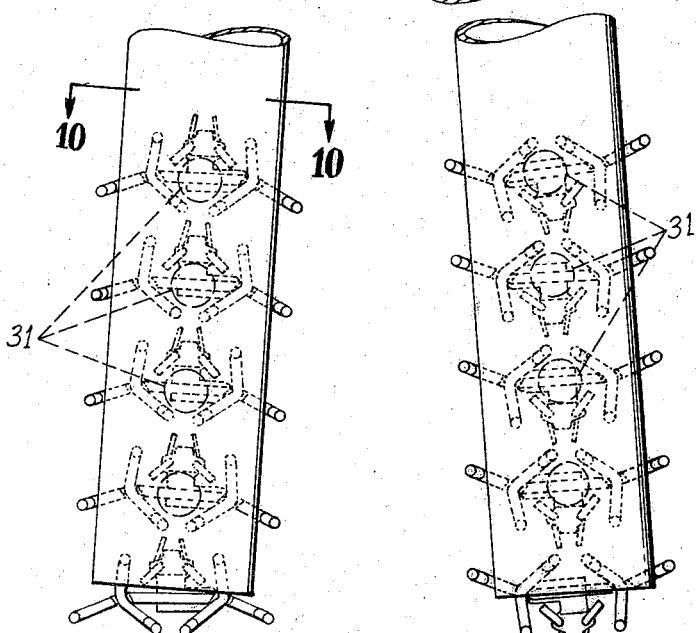
INVENTOR
RALPH J. STOLLE AND
ELTON G. KAMINSKI,
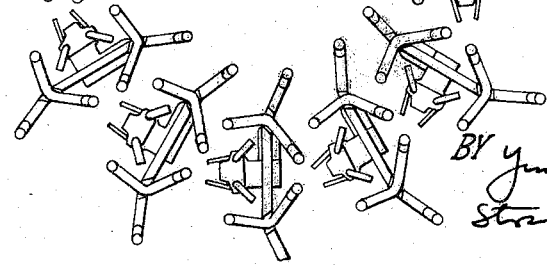
ATTORNEYS.

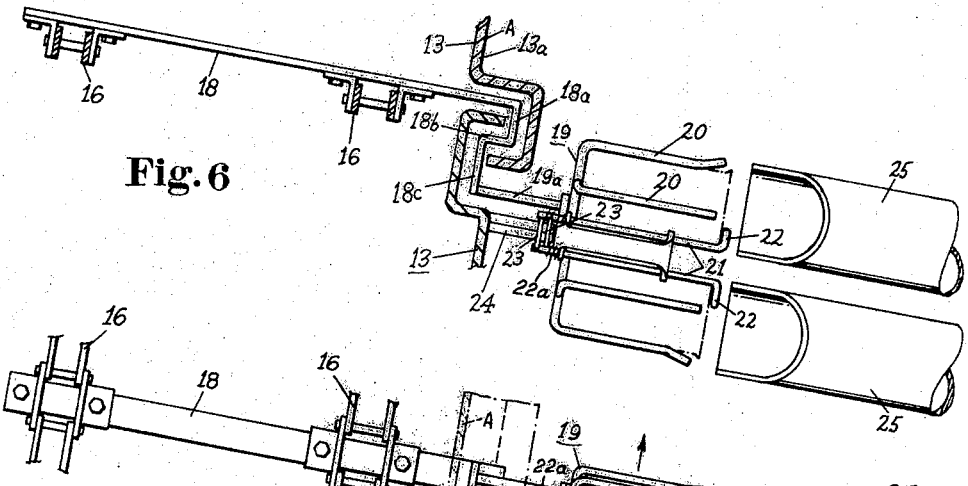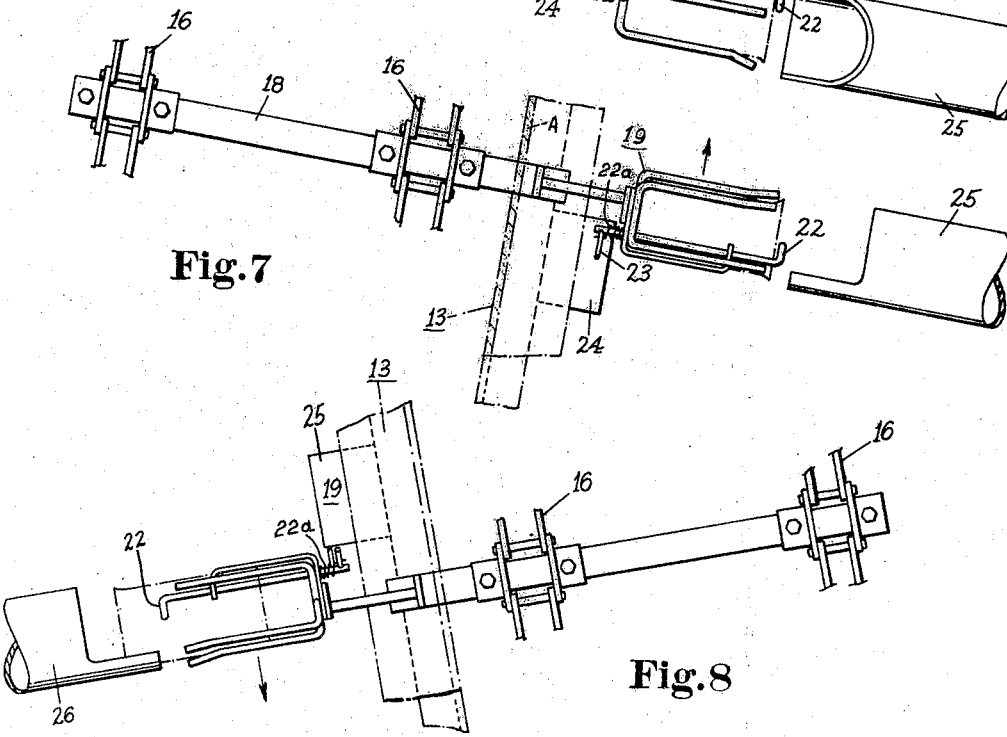

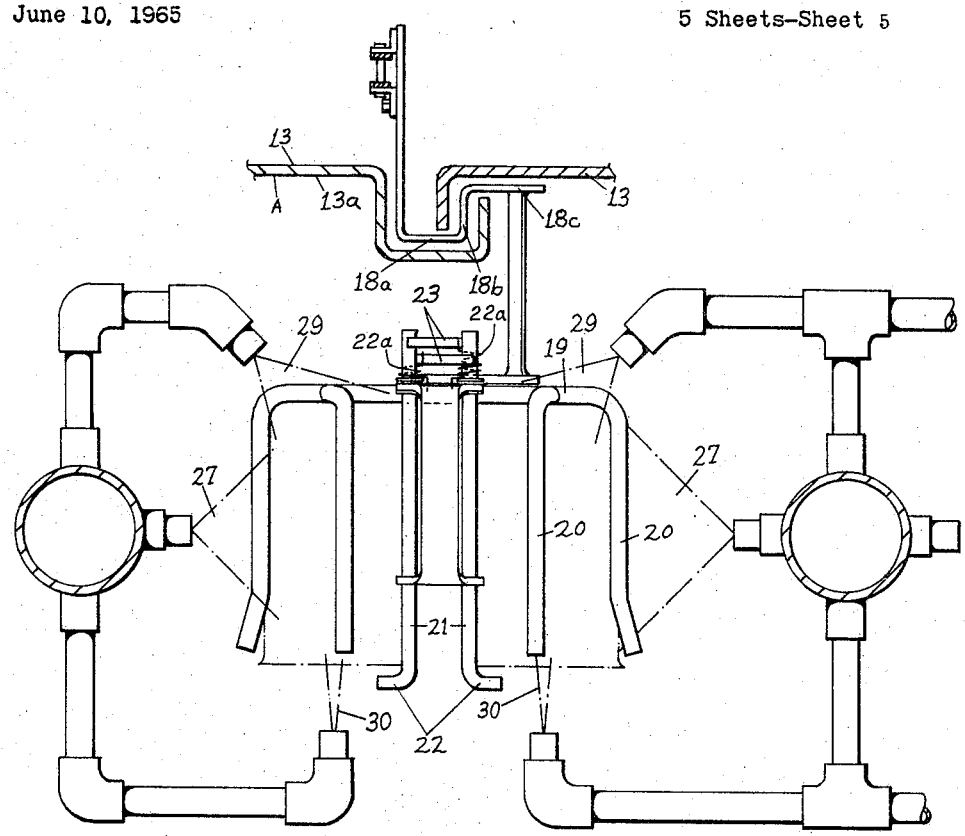
Fig. 9
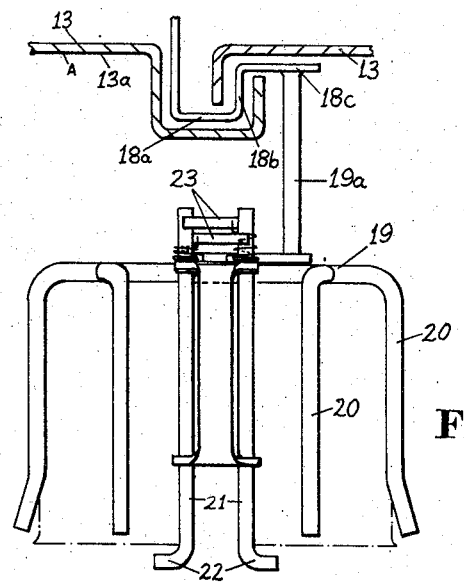
Fig. 10
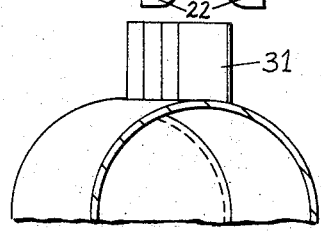

3,353,515
CAN TREATING APPARATUS
Ralph J. Stolle, Lebanon, and Elton G. Kaminski, Sidney, Ohio, assignors to The Stolle Corporation, Sidney, Ohio, a corporation of Ohio
Filed June 10, 1965, Ser. No. 462,870
6 Claims. (Cl. 118—73)

ABSTRACT OF THE DISCLOSURE

Apparatus for treating newly formed cans intended to contain beverages or foodstuffs to prepare them for packaging which includes a chamber divided into a front section where the treatment occurs and a rear section which contains a conveyor moving mechanism. The partition between these chambers is provided with a labyrinth path through which the can supports project and which protects the conveyor mechanism from the treating material.

---

This invention relates to a can treating apparatus and more particularly to an apparatus into which newly formed cans are fed and in which the cans are successively washed and rinsed, inside and outside, dried, and then coated on the interior and again dried so as to be ready for filling and decorating.

Apparatus of this general nature has been in use but it has been subject to various problems. One problem has been that the cans have been moved past sprays or jets of cleaning solution, rinsing solution, or coating solution and have been uniformly cleaned, rinsed or coated. Another problem has resided in the fact that the carrying mechanism for the cans has been subjected to the various treating liquids which has brought about deterioration of bearings, sprockets and chains, gears and other parts of the drive mechanism.

With the foregoing considerations in view, an object of the present invention involves the provision of an apparatus in which cans are caused to travel along a course intermittently and wherein the cans are halted momentarily and wherein in their halted position, each can is subjected to jets which are aligned to assure that the cans are properly treated.

Another object of the invention involves the provision of a structure in which the portion of the apparatus in which the cans travel is separated from the portion of the apparatus housing the drive mechanism in such manner that the various parts of the drive are not subjected to the treating fluids, whereby the problem of maintenance is greatly reduced.

Another object involves the provision of can holding members which permit of full and complete treatment of the can on its inside and outside surfaces. Yet another object of the invention involves the provision of means for retaining cans in the can holders and releasing them or opening the holders to permit insertion or removal of the cans at the entrance and exit ends of the machine.

The foregoing and other objects of the invention which will be described in more detail hereinafter or which will become apparent to one skilled in the art upon reading these specifications are accomplished by that certain construction and arrangement of parts of which the following will describe an exemplary embodiment.

Reference is made to the drawings forming a part hereof and in which:

FIG. 1 is a front elevational view of an apparatus according to the present invention.

FIG. 2 is an end elevational view of the same as seen from the left end of FIG. 1, i.e. the load end.

FIG. 3 is an end elevational view from the right of FIG. 1, i.e. the discharge end.

FIG. 5 is a fragmentary front elevational view of the machine in the drying section thereof.

FIG. 6 is a cross sectional view taken on the line 6—6 of FIG. 2 showing the construction of the baffle and the holders.

FIG. 7 is a fragmentary side elevational view as seen from the bottom of FIG. 6.

FIG. 8 is a view similar to FIG. 6 but taken at the discharge end of the machine.

FIG. 9 is a fragmentary cross sectional view taken on the line 9—9 of FIG. 4.

FIG. 10 is a fragmentary cross sectional view taken on the line 10—10 of FIG. 5.

Figure 4:
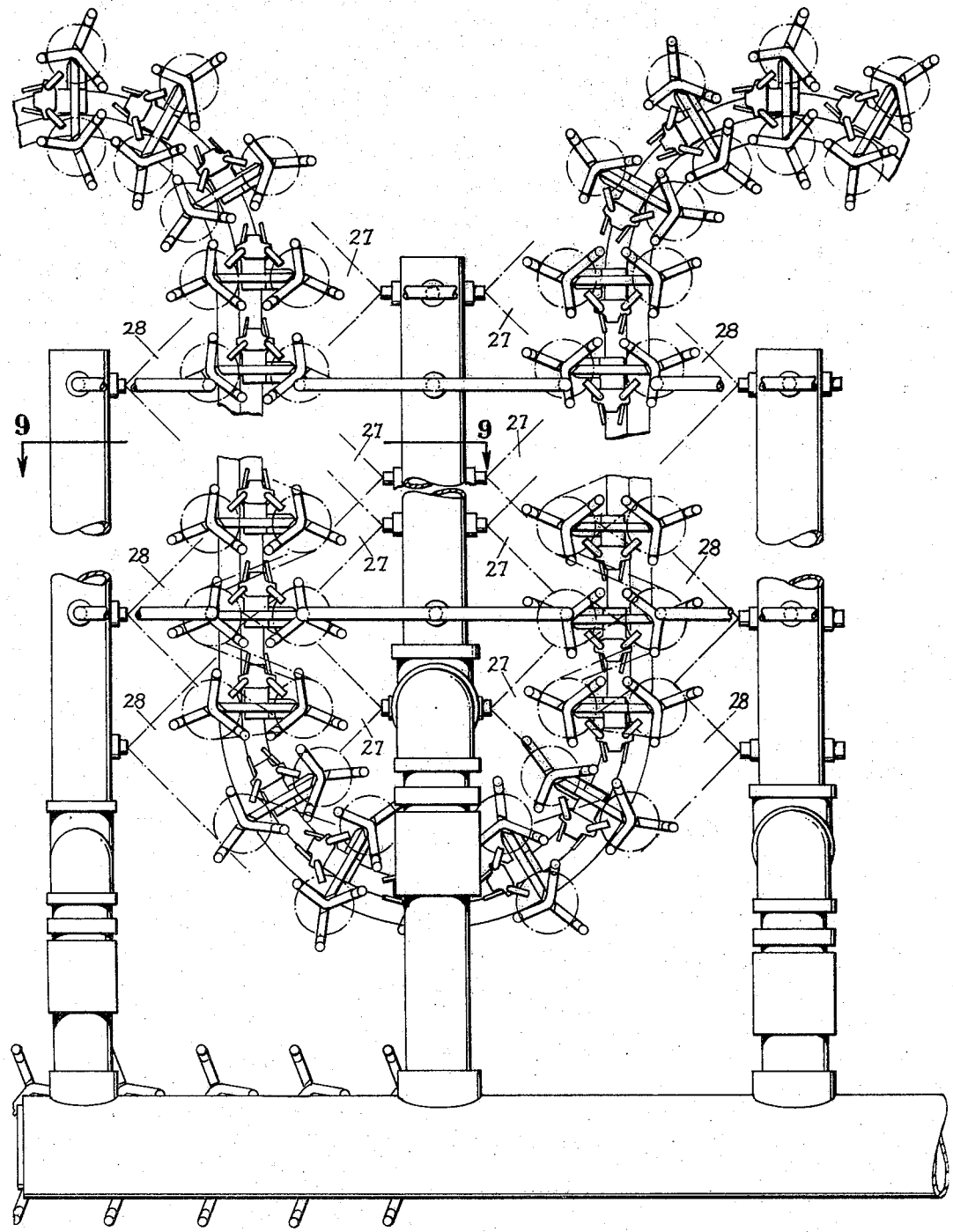
FIG. 4 is a fragmentary front elevational view on an enlarged scale in the washing section of the machine.

Briefly, in the practice of the invention, there is provided a cabinet which is roughly divided into a front section and a rear section by a baffle wall. The baffle wall is provided with a sinuous course along which the cans will travel and the baffle wall is provided with a continuous labyrinth opening through the baffle wall through which the rods or brackets for the can holders may pass in traveling along said course. Suitable fluid jets are arranged sinuously in the front section of the apparatus. In the rear section of the apparatus are provided a plurality of sprockets and chains to which the brackets for the can holders are secured and these together with all the gears and other drive mechanism are protected by the baffle from the fluids used in treating the cans. Means are provided to drive the sprocket chains intermittently and the various jets in the front section are disposed so that each time a can momentarily comes to rest, a jet is aimed at it axially, whereby thorough treatment is insured.

Referring now in more detail to the drawings, the apparatus is contained within a housing identified at 10. It will be understood that this housing is provided with suitable doors through which access may be had to various parts of the apparatus, but during operation the doors will be closed to prevent splashing of the treating fluids and also to protect the drive elements.

In FIGS. 2 and 3, the front section of the apparatus is indicated at 11 and the rear section at 12. These sections are divided by a baffle generally indicated at 13.

Suitably mounted in the rear section 12 are a plurality of shafts 14, each of which carries the spaced sprockets 15. The arrangement of the sprockets is perhaps best shown in FIG. 1 where the sprockets are shown at 15.

Endless sprocket chains 16 pass over the two sets of sprockets 15 in a sinuous path. An electric motor or other suitable drive apparatus drives one or more so-called intermitters which are simply conventional apparatuses for converting continuous motion into intermittent motion. One such intermitter is shown at 17 (FIGS. 2 and 3). From these intermitters the sprocket chain is driven. In actual practice, it is desirable to have the motor drive a plurality of intermitters 17 to distribute the load more uniformly.

In actual practice, the intermitters cause the sprocket chain to index or advance and stop fifty times per minute.

As perhaps best shown in FIGS. 6 to 8 inclusive, brackets 18 are secured to the two chains 16 at right angles thereto and to these brackets 18 are secured the can holders indicated generally at 19. It will be observed from a comparison of FIGS. 1, 6, 7 and 8, that the axes of the brackets 18 are inclined forwardly and downwardly and that the baffle indicated generally at 13 is also inclined forwardly upwardly. The construction of the labyrinth path through the baffle is best seen in FIG. 6 and it will be seen that the portions 13a and 13b overlap each other and that they are provided with channel-like structures along their edges which, so to speak, interdigitate to form a labyrinth path through the baffle. It will be observed that the bracket 18 is provided with a configuration consisting of a right angle bent portion at 18a, a return bent portion at 18b, and a portion 18c at right angles to the main body of the bracket 18. A rod 19a is welded or otherwise suitably secured to the end of the portion 18c to carry the can holders 19. The configuration shown in FIG. 6 prevails throughout the course of the chain in any section normal to the chain at any point. Therefore, as the chain moves along on its course, the brackets and the can holders are carried along, moving through the labyrinth path described above and because of the construction of the labyrinth path, spray from the jets is prevented from entering into the rear section 12 of the apparatus.

The can holders themselves are best seen in FIGS. 6, 7 and 8 and also in FIGS. 4 and 5 in end view. Each member 19a carries two can holders side by side and each of these is made up of three fingers 20 uniformly spaced approximately 120° apart and curved outwardly at their ends. The three fingers 20 are so spaced that a can is fairly loosely held therein but under the effect of the various jets the can can rotate about its own axis within the holder Additionally, each holder is provided with a retaining finger 21 and each retaining finger has an inturned end 22. These fingers are rotatably arranged and at their inner ends are provided with actuating elements 23 which are urged to closing position by springs 22a, wherein the portions 22 will retain a can in the holder. In this position the elements 23 are disposed in crossing relationship.

At the load end of the machine, as seen in FIG. 7, wherein the chains 16, the bracket 18 and the holders 19 are moving upwardly, there is provided a stationary cam 24 fixed to the dividing wall or other portion of the frame and positioned to enter between the actuating members 23 to force them apart, thus opening the fingers 21 to permit cans to be loaded into the holders. The cans to be treated may be fed to the holders 20 through pneumatic tubes 25 as seen in FIGS. 6 and 7. As soon as the chain advances to the next step from the position of FIG. 7 upwardly, the members 23 will ride off the can 24 and the fingers 22 will return to retaining position to retain therein a can which has been loaded into the apparatus.

Similarly, at the discharge end of the apparatus a cam 25 is provided and this cam again opens the fingers 22 to permit the discharge of the treated cans into pneumatic tubes 26 or the like.

In FIG. 4 a portion of either the washing or rinsing section of the apparatus is shown in more detail and the various manifolds are shown for bringing the treating fluids to the jets for spraying onto the individual cans. It will be seen that jets are provided as at 27 and 28 for projecting either a detergent or a rinsing solution onto the outer surfaces of the cans and, as best seen in FIG. 9, jets 29 provide for treating the bottoms of the cans and jets 30 for treating the insides of the cans.

It will be understood that the jet arrangements for the washing and rinsing sections of the apparatus may be identical since it is desired to apply detergent solution to all exposed surfaces of the can, inside and out, and of course it is similarly desirable to apply rinsing solution to all surfaces of the can, inside and out.

In the drying section of the apparatus, the arrangement is quite similar as shown in FIG. 5 and FIG. 10, and warm air jets 31 provide drying air or gas to all surfaces of the cans.

It will be understood that in treating sections where it is desired, for example, to coat the insides of the cans only, jets similar to the jets 30 will be provided and if this is so, then the drying section following the coating section will only have drying jets to treat the interior of the cans.

It will be observed that by virtue of the angle at which the cans are carried through the apparatus, the treating fluids and particularly the treating liquids continuously drain from the interior of the cans and this helps to insure thorough cleaning and thorough rinsing. In the coating section of course it assists in preventing excess coating material from being applied.

It will be understood that numerous modifications may be made without departing from the spirit of the invention. In actual practice, the brackets have been fastened to the chains at a concentration of three per foot of chain so that for each foot of chain there are three brackets and six can holders. The indexing rate of fifty per minute is exemplary and under various conditions a slower or faster rate may prove desirable. No limitations not specifically set forth in the claims are intended or should be implied.

The embodiments of the invention in which an exclusive property or privilege is claimed are defined as follows:

1. A can treating machine comprising a casing, a dividing wall in said casing separating it into a front section and a rear section, a plurality of sprockets rotatably mounted in said rear section, and an endless chain in operative relation to said sprockets, means for driving one, at least, of said sprockets intermittently to cause said chain to advance in equal increments along its course, an opening through said dividing wall along the path of said chain, the adjacent edges of said wall along said opening being arranged in spaced overlapping relation providing a labyrinth path through said wall, a plurality of bracket members secured at spaced points along said chain and having a generally S-shaped portion positioned to pass through said labyrinth path and extending into the front section of said casing, a can holder on each of said bracket members in said front section, and means to retain a can in each of said holders, and a plurality of jets for treating fluid disposed along the course of said chain, said jets being positioned to direct a stream of said treating fluid to a can momentarily stopped before it by said intermittent driving means.

2. A machine according to claim 1, wherein said dividing wall slopes forwardly and upwardly, wherein said sprockets and chain are disposed to cause said chain to travel in a course in a plane parallel to said dividing wall, and wherein said brackets extend into the front section of said casing normal to said dividing wall, whereby the cans are positioned in said holders with their open ends facing downwardly at an angle.

3. A machine according to claim 1, wherein said sprockets and chain are arranged to carry said brackets in a sinuous course, and said jets are arranged along said sinuous course.

4. A machine according to claim 1, wherein each of said holders comprises a plurality of spaced, parallel fingers providing an open cage of a size to freely accommodate a can, and a retaining finger having its end extending at right angles to its length, said finger being axially pivotable and being biased to retaining position; and means to pivot said finger at the entrance and exit ends of the machine to permit insertion of a can to be treated, and removal of a treated can, respectively.

5. A machine according to claim 4, wherein each said bracket carries two holders in side by side relation, and wherein the means to pivot said finger comprises an actuating member and stationary cam means, and wherein each of said retaining fingers is provided with an actuating member, and wherein stationary cam means are provided at the entrance end and at the exit end of said machine, whereby as each pair of holders arrives in loading position and unloading position, said actuating members are acted upon by said cams to pivot said retaining fingers to open position.

6. A machine according to claim 5, wherein said actuating members are arranged in crossing relation, and wherein said cam means are disposed to enter between said crossed actuating members to force them apart, thereby pivoting said retaining fingers to open position.

References Cited

UNITED STATES PATENTS

| | | | |
|---|---|---|---|
| 1,708,429 | 4/1929 | Mueller et al. | 118—423 X |
| 2,528,087 | 10/1950 | Schoepe | 118—326 X |
| 2,579,575 | 12/1951 | Herdlein | 134—114 |
| 2,699,750 | 1/1955 | Wittkuhns et al. | 118—423 X |
| 3,107,677 | 10/1963 | Romine et al. | 134—131 X |

CHARLES A. WILLMUTH, *Primary Examiner.*

J. P. McINTOSH, *Assistant Examiner.*

UNITED STATES PATENT OFFICE
CERTIFICATE OF CORRECTION

Patent No. 3,353,515                            November 21, 1967

Ralph J. Stolle et al.

It is hereby certified that error appears in the above numbered patent requiring correction and that the said Letters Patent should read as corrected below.

Column 1, line 32, after "have" insert -- not --.

Signed and sealed this 14th day of January 1969.

(SEAL)
Attest:

Edward M. Fletcher, Jr.                          EDWARD J. BRENNER
Attesting Officer                                Commissioner of Patents